(12) United States Patent
Terstiege et al.

(10) Patent No.: US 10,347,159 B2
(45) Date of Patent: Jul. 9, 2019

(54) IDENTIFICATION PANEL AND METHOD FOR PRODUCTION THEREOF

(71) Applicant: Nienstedt GmbH, Haltern am See (DE)

(72) Inventors: Lars Terstiege, Haltern am See (DE); Markus Wilms, Haltern am See (DE)

(73) Assignee: Nienstedt GmbH, Haltern am See (DE)

( * ) Notice: Subject to any disclaimer, the term of this patent is extended or adjusted under 35 U.S.C. 154(b) by 0 days.

(21) Appl. No.: 15/125,988

(22) PCT Filed: Mar. 24, 2014

(86) PCT No.: PCT/EP2014/055872
§ 371 (c)(1),
(2) Date: Sep. 14, 2016

(87) PCT Pub. No.: WO2015/144205
PCT Pub. Date: Oct. 1, 2015

(65) Prior Publication Data
US 2017/0098395 A1    Apr. 6, 2017

(51) Int. Cl.
*G09F 7/16* (2006.01)
*B32B 3/26* (2006.01)
(Continued)

(52) U.S. Cl.
CPC ............. *G09F 7/165* (2013.01); *B32B 3/266* (2013.01); *B32B 3/30* (2013.01); *B32B 7/02* (2013.01);
(Continued)

(58) Field of Classification Search
CPC .................................. G09F 7/00; G09F 15/02
See application file for complete search history.

(56) References Cited

U.S. PATENT DOCUMENTS 6,677,021 B1 * 1/2004 Barnette .................. G09F 7/00
                                                          40/594
7,150,119 B1 * 12/2006 Nudo, Jr. ................. G09F 7/00
                                                          40/615
(Continued)

FOREIGN PATENT DOCUMENTS

CN    2390833 Y    8/2000
CN    2643428 Y    9/2004
(Continued)

OTHER PUBLICATIONS

International Search Report for PCT/EP2014/055872 dated Jan. 20, 2015 (with English translation; 6 pages).
(Continued)

*Primary Examiner* — Gary C Hoge
(74) *Attorney, Agent, or Firm* — Bejin Bieneman PLC

(57) ABSTRACT

An identification panel has a first, upper plastic ply in a first color and at least one second plastic ply, situated below the first plastic ply, in a second color, with depressions being provided in the first, upper plastic ply, by removal of material, for the representation of characters or symbols, and extending as far as the second, lower plastic ply. A method for producing an identification panel of this kind provides for depressions to be made in the first plastic ply by removal of material to generate characters or symbols, the depressions extending through the first plastic ply at least as far as the second plastic ply.

15 Claims, 3 Drawing Sheets

(51) Int. Cl.
*B32B 3/30* (2006.01)
*B32B 7/02* (2019.01)
*B32B 7/04* (2019.01)
*B32B 27/08* (2006.01)
*B32B 27/32* (2006.01)
*G09F 23/00* (2006.01)
*G09F 7/18* (2006.01)

(52) U.S. Cl.
CPC ............. *B32B 7/04* (2013.01); *B32B 27/08* (2013.01); *B32B 27/32* (2013.01); *G09F 23/00* (2013.01); *B32B 2250/242* (2013.01); *B32B 2307/404* (2013.01); *B32B 2590/00* (2013.01); *G09F 2007/1869* (2013.01)

(56) References Cited

U.S. PATENT DOCUMENTS

| | | | | |
|---|---|---|---|---|
| 2005/0127240 A1* | 6/2005 | Culp | ............ | B63H 9/0685 244/15 |
| 2009/0038742 A1* | 2/2009 | Komatsu | ............ | B32B 7/02 156/154 |
| 2010/0313455 A1* | 12/2010 | Kim | ............ | B32B 27/08 40/594 |
| 2012/0128844 A1* | 5/2012 | Gentry | ............ | A21C 15/00 426/383 |
| 2014/0154384 A1* | 6/2014 | Vardakostas | ............ | A21C 9/04 426/531 |

FOREIGN PATENT DOCUMENTS

| | | |
|---|---|---|
| EP | 2760007 A1 | 7/2014 |
| FR | 2575114 A1 | 6/1986 |
| JP | S52-92833 A | 8/1977 |
| JP | S54-20685 U | 2/1979 |
| JP | 2002-536211 A | 10/2002 |
| JP | 2003-342457 A | 12/2003 |
| JP | 2006-289622 A | 10/2006 |
| WO | 00/46045 A2 | 8/2000 |
| WO | 2007041411 A2 | 4/2007 |

OTHER PUBLICATIONS

Notice of Reasons for Rejection for Japanese Patent Application No. 2017-501468 dated Jan. 19, 2018 (English translation; 3 pages).

Japanese Patent Office Decision of Final Rejection for JP Patent Application No. 2017-501468 dated Dec. 12, 2018 (with English translation).

Chinese Patent Office First Office Action for Application No. CN2014800774477 dated Jul. 2, 2018 (16 pages; with English translation).

* cited by examiner

IDENTIFICATION PANEL AND METHOD FOR PRODUCTION THEREOF

CROSS-REFERENCE TO RELATED APPLICATIONS

This application is a national stage of, and claims priority to, Patent Cooperation Treaty Application No. PCT/EP2014/055872, filed on Mar. 24, 2014, which application is hereby incorporated herein by reference in its entirety.

BACKGROUND

Identification panels are known in the form of safety and health protection markers in workplaces. They may be configured in particular as prohibition signs, as imperative signs, as warning signs, as rescue signs, as fire protection signs or merely as information signs.

Machines of a very wide variety of kinds, as well, are provided with identification panels in order to inform the user of possible hazards or particular aspects of the machines' operation.

Identification panels of this kind are customarily configured as film stickers, or plate-like supports bearing coatings or printing are used, and are attached to the machine in a variety of ways.

In the case of machines which are used in the food-processing industry, however, specific problems arise, which make it problematic to use customary identification panels available on the market.

A first issue is the required compatibility of the materials used with foods, including compatibility with drinking-water. This means that the materials used ought to have undergone approval as food contact material.

A further factor is that in contrast to appliances used in the household, for example, machines which are used in the food-processing industry must be cleaned regularly in accordance with stringent protocols. The cleaning agents used in such operations are often extremely aggressive, and are used in different stages of dilution in accordance with the particular country and the protocol in force there. Furthermore, in the course of cleaning, the machine surfaces and hence also any identification panels mounted thereon are also subject to severe mechanical stress, by means of brushes or high-pressure cleaners, for instance. Under these conditions as well, therefore, materials used for identification panels must be suitable for use on a food-processing machine and may not, for example, suffer corrosion, exhibit any propensity toward fragmentation or breakage, and may not come apart.

Trials with identification panels available on the market have shown that they do not durably withstand intact the chemical and mechanical exposure associated with regular cleaning operations. Products tested were not only film stickers (adhered to a stainless-steel support sheet) but also stainless-steel identification panels with a coated-on pictogram and an overlying coating of protective varnish (the varnish used in each case was one declared as acid-resistant), and also Resopal plates. They were placed in cleaning agent for a period of several hours, and were sprayed off at regular intervals with a high-pressure cleaner. In all cases, after each of the test procedures, the identification panels showed relatively severe damage. Either the pictograms had detached (stickers), or the marking—after having been attacked by the chemical cleaner—did not stand up to exposure to the high-pressure cleaner (varnished stainless-steel support sheet), or the support material was swollen and the pictogram and constituents of the support material became detached (Resopal panel). A Resopal panel with a propensity to fragment, a varnished metal sheet, or remnants of sticker which have detached, furthermore, are also problematic in particular because fragments, detached varnish or remnants of sticker will not be recognized by metal detectors, which are used in order to pickup any extraneous metallic substances, and will at worse enter the food processing operation.

If the aim is to ensure that a machine is properly labeled over the long term, therefore, the identification panels must be renewed regularly. This requires not only the replacement of damaged markers but also the regular monitoring of the machine's labeling, and an associated administrative cost.

Another consideration is that information panels used ought also to have been designed in such a way that they can be attached to the food-processing machines in accordance with hygiene considerations. Thus, for example, stickers, at whose regularly slightly detaching edges residues of cleaning agent or food may collect, are not suitable for use on machines which are employed for industrial food processing. The same is also true of other kinds of markers which cannot be easily mounted by the user and demounted for purposes of cleaning, or which, even in the machine-mounted state, allow easy cleaning of any gaps which form between machine surface and identification panel.

SUMMARY

The present disclosure relates to identification panels for use on or in the immediate vicinity of machines which are used for industrial food processing, and also to methods for producing such identification panels.

Disclosed herein is an identification facility, especially for use on machines for the food-processing industry, which is able to withstand the above-described exposures unhesitatingly and durably.

An identification panel comprises a first, upper plastic ply in a first color, and at least one second plastic ply, situated below the first plastic ply and made from the same material, in a second color, and, for the representation of characters or symbols, depressions are provided in the first, upper plastic ply, by removal of material, and extend as far as the second, lower plastic ply.

The first and second plastic plies here preferably adjoin one another directly. "Directly" in this context means that the two plies are connected to one another without the use of an adhesion-promoting interlayer (an adhesive layer, for example) located between the plies. This prevents aggressive media or, for example, the jet of a high-pressure cleaner from penetrating between the layers and possibly adversely affecting the bonding of the two plastic plies.

In order to achieve the above-described direct bonding of the plastic plies, provision may be made in particular for the first plastic ply and the second plastic ply to be connected thermally to one another. Suitable plastics may be surface-joined or welded under the action of heat and pressure, and at a molecular level, during the joining operation, enter into a bond which is no longer partable at the interfaces between the individual layers.

The depressions which are to be made in the identification panel for the purpose of generating characters or symbols, or for the pictograms customary in the case of indicator panels, preferably extend completely through the first plastic ply and into the second plastic ply. This ensures that the respective depression fully penetrates the first plastic layer and that the second color of the second plastic layer, which is different from the first color of the first plastic layer, is revealed. The term "color" here is a reference to any coloring of the plastic layer in question, including the "color" of the uncolored plastic processed in its pure form (in the case of PE, for example, a milky white). Provision is made more particularly for the individual plastic plies to be colored right through.

Contemplated in particular as material for the identification panel and/or its individual plastic plies are plastics approved as food contact material. On the basis of its chemical stability and unobjectionability on contact with foods and drinking-water, and its high suitability for welding, polyethylene (PE) has proven particularly suitable, with the use being possible here of various PE grades (HDPE, LDPE, LLDPE, PE-HMW, etc.). Other plastics as well, however, having suitable physical properties may be employed for use and production of the identification panels. With preference all the plastic plies are made from the same plastic or the same grade of plastic. From the description below of possible production methods it is evident that the plastic plies, in order to be able to enter into a bond at a molecular level, ought to be formed of plastics which can be welded to one another.

The depressions in the identification panel are produced preferably by cutting removal of material, e.g., by milling.

The depressions are preferably produced after the plastic plies, as yet not provided with depressions, have been connected to one another. This excludes the possibility, if the depressions constituting the pictogram fully surround a part-region of a plastic ply, of this part-region becoming incorrectly positioned during production, owing to the otherwise still absent attachment to the underlying plastic ply, since as a self-standing section it could slip or even be lost.

The identification panel is not confined to only two plastic plies, but may instead also comprise a third or else two or more further plastic plies. Each plastic ply apart from the first, upper plastic ply may be connected directly to the underside of the plastic ply situated above it, with each plastic ply preferably having a different color. In one embodiment, accordingly, the identification panel, further to the first and second plastic plies, comprises one or more further plastic plies whose color differs from the colors of the first and second plastic plies, and depressions for the representation of characters or symbols extend as far as to the further plastic ply. Preferably the depressions extend into this further plastic ply.

With the example described above and with the resultant multiple-layer and multiple-color layer construction, it is possible to represent more than just two colors with the identification panel.

The features described above for an identification panel having only first and second plastic plies apply correspondingly to the identification panels having more than two plastic plies.

The method for producing the above-described identification panels (prohibition signs, imperative signs, warning signs, rescue signs, fire prevention signs or information signs, as safety and health protection marking in the workplace) envisages depressions being made into the first plastic ply by removal of material, in order to produce characters or symbols, with the depressions extending through the first plastic ply at least as far as the second plastic ply, or even extending into the second plastic ply.

Before depressions are introduced, a blank is produced by joining together directly at a molecular level a first ply of a plastic having a first color and a second ply of a plastic having a second color, by thermal welding. As described above, further to the first and second plastic plies, there may be one or more further plastic plies provided, whose color is different from the colors of the first and second plastic plies, with depressions for the representation of characters or symbols, or pictograms, extending as far as to the further plastic ply or into said ply, depending on the color to be represented.

The first plastic ply and the second plastic ply are preferably surface-joined to one another or welded, as band material from a roll or as strip material, under the action of heat and pressure, so that the plastic plies directly adjoining one another enter at the interface into a bond with one another at a molecular level. It is likewise possible for the individual plastic plies to be connected with one another immediately after the extrusion operation, in the still hot, tough and elastic state, optionally with the aid of rolls or similar accessories. The use of an adhesion-promoting layer becomes unnecessary, and, because of the molecular bonding of the individual layers to one another, identification panels produced in this way are extraordinarily robust and easily and durably withstand the test cycles described at the outset, without individual plastic plies parting from one another.

In addition to the use of roll, band or strip material, plastic plates of relatively small size may also be connected to one another, especially for producing small numbers of units or individual pieces.

Alternatively, provision may also be made for the first plastic ply to be in-mold-coated with the material of the second plastic ply, and optionally for the second plastic ply to be in-mold-coated with the material of a further plastic ply (and so on). By this means as well, the individual layers enter into an inseparable bond with one another.

A further possibility is to pour the first plastic, of a first color for the first plastic ply, in the form of pourable pellets or powder, into a mold, to level it smooth if required, then to pour plastic pellets of a second color onto the plastic pellets forming the first plastic ply, followed optionally by further plastic pellets of a further color, before then pressing the different-colored pellet layers onto one another under the action of heat, preferably with the aid of a die, and fusing them to one another. The individual plastic plies may also be compacted layer by layer; in other words, following the application of each layer, compaction is carried out briefly by means of a die or similar tool. In order to minimize any air inclusions, the fusing may take place under reduced pressure. In this way as well it would be possible to produce the layer construction needed for the invention, and the molecular bonding of the individual planes.

It would also be possible to use an existing, prefabricated plastic plate as a baseplate for one of the plastic plies, and then to scatter plastic pellets for a further plastic ply onto this plate. That would give rise to a more precisely defined interface between the plies, and the two plies would not intermix to the same extent as if pellets were used for both plies. Owing to the reduced mixing, moreover, this would allow lower layer thicknesses.

The layer thicknesses of the individual plastic plies of the identification panel are preferably between 1 mm and 6 mm, more preferably between 2.5 mm and 4.5 mm. The layer thicknesses of these individual plies need not all be the same. It may, for example, be appropriate to make the first plastic ply, as a support layer, thicker (e.g., 4 mm or 5 mm) than the second plastic ply situated above it, in order to endow the identification panel overall with the requisite stability. The layer thickness of the second plastic ply, into which primarily the depressions are then made in order to produce a pictogram, and which consequently per se is inherently less stable, may then be lower (e.g., 2 mm).

Identification panels of the kind described above are, in particular, also sufficiently rigid to be attached to machine surfaces by screws, clips or attachment means that are similarly easily redetachable. The use of spacers allows a sufficient gap between machine surface and identification panel reverse, ensuring that the machine surface and the reverse of the identification panel are accessible to cleaning even in the case of identification panels mounted on the machine.

Further advantages will become apparent from the description below of preferred exemplary embodiments with reference to the drawings.

DETAILED DESCRIPTION

Figure 1:
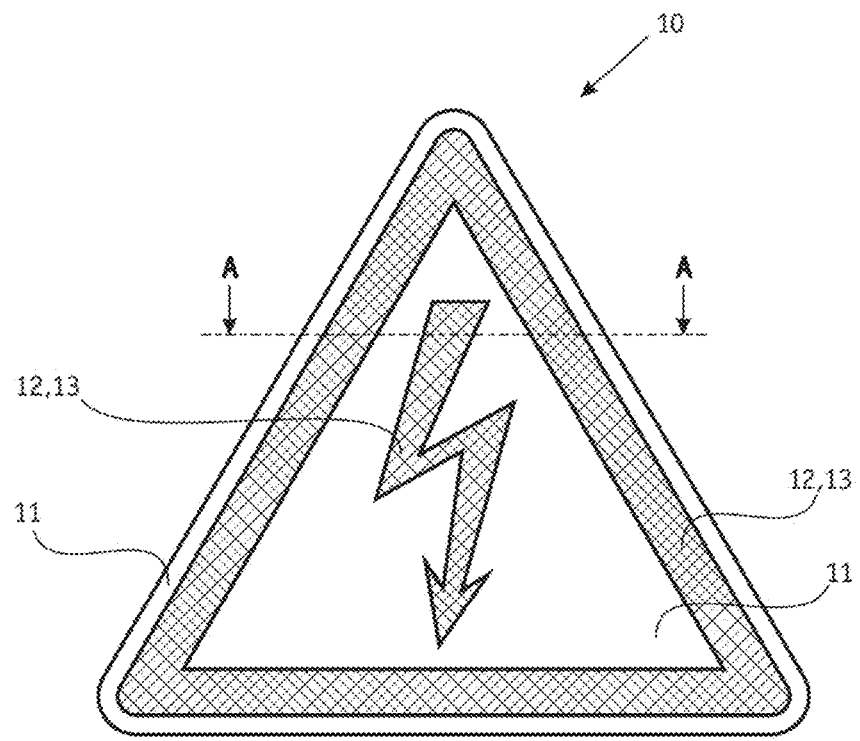
FIG. 1 shows a first identification panel, designed as a warning sign.

FIG. 1 shows an identification panel 10, designed by way of example as an electrical voltage warning sign. The identification panel 10 is shown in FIG. 2 in a section along the line A-A shown in FIG. 1; for clarity, the edges of the body that are situated behind the plane of the drawing have not been shown.

Figure 2:
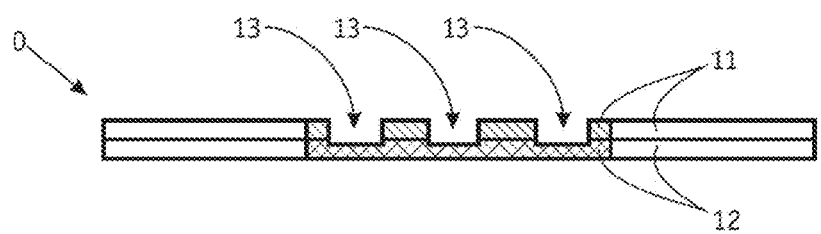
FIG. 2 shows the identification panel from FIG. 1 in a section along line A-A.

As can be seen from FIG. 2, the identification panel 10 has a first, upper plastic ply 11 and a second, lower plastic ply 12. The second plastic ply 12 bears with its top surface against the underside of the first plastic ply 11, and is connected to it at a molecular level as a result of previous welding (thermal joining). The first plastic ply 11 has a first color (unhatched region; in the case of the example shown in FIG. 1, typically yellow), and the second plastic ply 12 has a second color (cross-hatched region; in the case of the example shown in FIG. 1, typically black).

As can be seen from FIG. 2, depressions 13 have been made by milling into the first plastic ply 11, these depressions 13 extending in the plastic plies 11, 12 in parallel and projecting through the first plastic ply 11 into the second plastic ply 12. As a result of these depressions 13, in accordance with the course of the boundary edges of the depressions 13, which correspond to the letter or symbol to be represented, the color of the second plastic ply 12 is exposed through the first plastic ply 11, and so the letters or symbols become representable.

Figure 3:
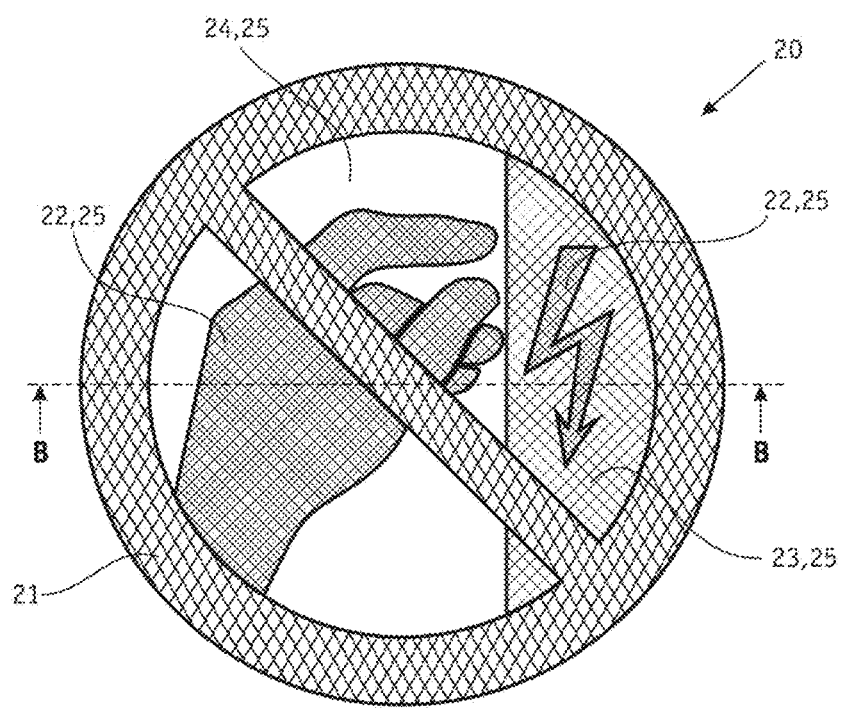
FIG. 3 shows a second identification panel, designed as a prohibition sign.

FIG. 3 shows a second example of an identification panel 20; in this case, by way of example, a prohibition sign is represented, which prohibits contact with an electrified surface.

This prohibitory sign has a total of four plastic plies 21, 22, 23, 24, each with different coloring. The identification panel shown by way of example in FIG. 3 typically has the colors red (rhomboidally hatched area, first plastic ply 21), black (area cross-hatched with closer mesh, second plastic ply 22), medium-gray (area cross-hatched with wider mesh, third plastic ply 23), and white (unhatched area, fourth, bottommost plastic ply 24).

Figure 4:
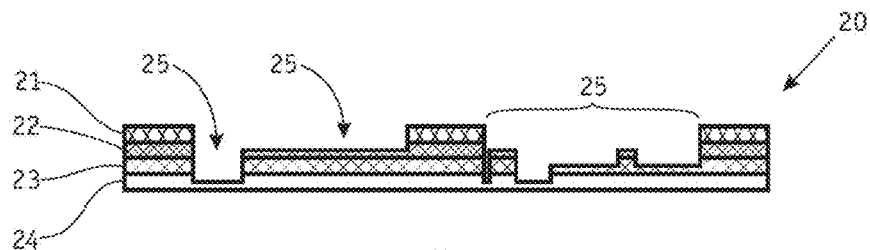
FIG. 4 shows the identification panel from FIG. 3 in a section along line B-B.

The optical representation of the pictogram which can be seen in FIG. 3, as also shown illustratively by FIG. 4, as a representation of the sectional plane along line B-B in FIG. 3, is achieved by the making of depressions 25 (milled indentations) which extend to different depths and into differently colored plastic plies, with each of the depressions extending as far as to the plastic ply whose color is to be visible at the respective location.

In FIG. 4, as in FIG. 2, the edges of the body located behind the plane of the drawing or section, respectively, have not been shown, for clarity.

Figure 5:
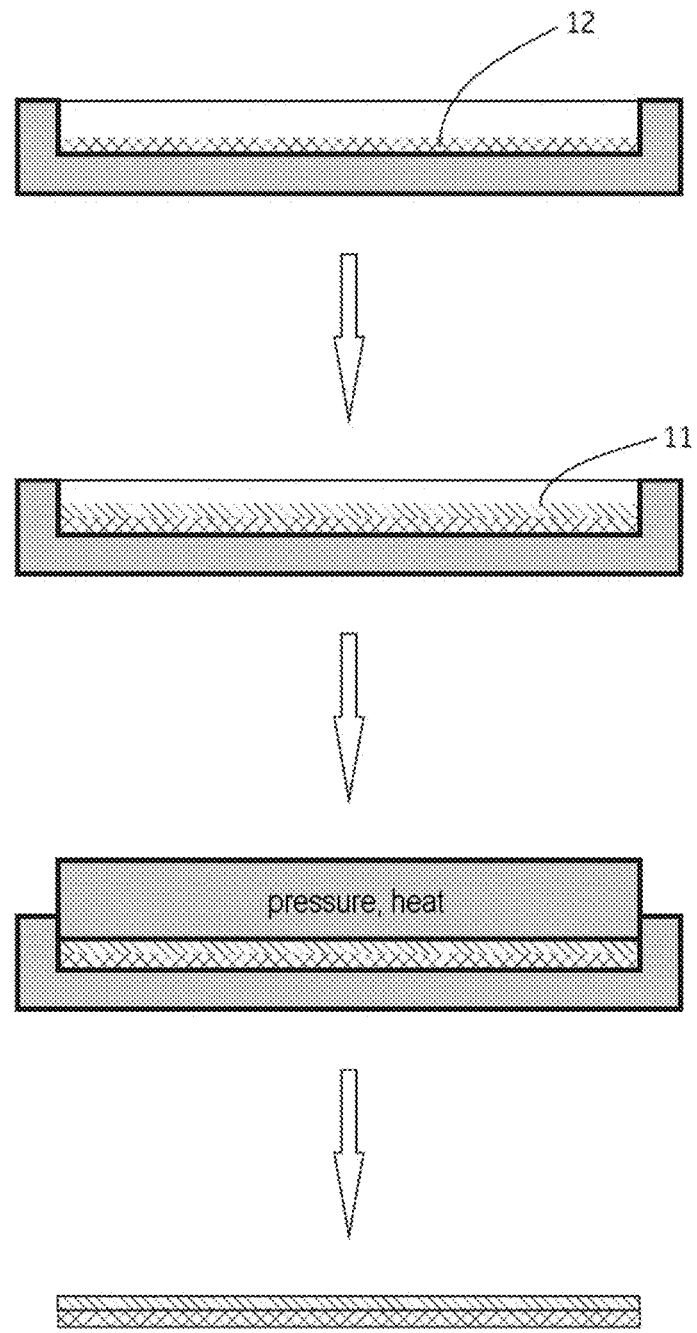

FIG. 5, finally, in a greatly schematized manner, illustrates a method for producing a multilayer plastic plate having plastic plies of different colors that are joined to one another at a molecular level. First of all, a ply 12 of a plastic of one color is poured into a mold in the form of pellets, or else a plastic plate already fabricated is inserted. Subsequently, a further ply 11 of preferably the same plastic material, in a different color, is poured onto this ply or plate 12. Thereafter the plies are compressed and baked together, i.e., joined by the action of heat and pressure, so that the plies 11, 12 are connected to one another at a molecular level at the interface. When using a plate, of course, the individual steps could also be reversed, by pouring the plastic ply 12 into the mold and then placing the ply 11 as the top ply, in the form of an already fabricated plate, onto the poured lower layer 12.

The invention claimed is:

1. An identification panel for use on machines for industrial food processing, comprising:
   a first, upper, plastic ply in a first color; and
   at least one second plastic ply, situated below the first plastic ply, in a second color;
   wherein, for representation of characters or symbols, depressions are provided in the first, upper plastic ply, by removal of material, and extend one of as far as and into the second plastic ply;
   wherein the first plastic ply and the second plastic ply are thermally joined to one another and directly adjoin one another on a molecular level without an adhesion-promoting interlayer.

2. The identification panel of claim 1, wherein the depressions extend through the first plastic ply and into the second plastic ply.

3. The identification panel of claim 2, wherein the first and/or the second plastic ply is made of polyethylene (PE).

4. The identification panel of claim 1, wherein the plastic plies are made of food-grade plastic.

5. The identification panel of claim 4, wherein the first and/or the second plastic ply is made of polyethylene (PE).

6. The identification panel of claim 1, wherein the depressions in the first plastic ply are made by removing material by cutting.

7. The identification panel of claim 1, wherein, in addition to the first and second plastic plies, there is a third plastic ply whose color differs from the colors of the first and second plastic plies, and depressions for the representation of characters or symbols extend as far as to the third plastic ply.

8. The identification panel of claim 7, wherein the depressions extend at least partly through the first and second plastic plies and into the third plastic ply.

9. The method of claim 7, wherein the first plastic ply and the second plastic ply form and identification panel that is sufficiently rigid to maintain a gap between a reverse side of the panel and a machine surface.

10. A method for producing identification panels of claim 1 that comprise a first, upper plastic ply in a first color; and at least one second plastic ply, situated below the first plastic ply, in a second color, the method comprising:

joining the first plastic ply having the first color and at least one second plastic ply having the second color thermally to one another so that the first plastic ply and the second plastic ply directly adjoin one another on a molecular level without an adhesion promoting interlayer; and making depressions in the first plastic ply by removal of material to produce characters or symbols, the depressions extending through the first plastic ply at least as far as the second plastic ply.

11. The method of claim 10, further comprising connecting, to the first and second plastic plies, at least one third plastic ply.

12. The method of claim 11, further comprising surface-joining the first plastic ply and the second plastic ply to one another as band material from a roll or as strip material under the action of heat.

13. The method of claim 10, further comprising surface-joining the first plastic ply and the second plastic ply to one another as band material from a roll or as strip material under the action of heat.

14. The method of claim 10, further comprising pouring at least one of the second plastic layers into a mold and then baking the at least one second plastic layer together with the first plastic ply under the action of heat and pressure for thermal connecting of the plastic plies.

15. The identification panel of claim 1, wherein the identification panel is sufficiently rigid to maintain a gap between a reverse side of the panel and a machine surface.

* * * * *